United States Patent

Herlihy

[11] Patent Number: 5,922,458
[45] Date of Patent: Jul. 13, 1999

[54] DISPLAY HOLDER EASEL AND WORK BOARD EMPLOYING REUSABLE PRESSURE SENSITIVE ADHESIVE

[76] Inventor: Virginia L. Herlihy, 4505 Revillo Dr., San Diego, Calif. 92115

[21] Appl. No.: 08/587,144

[22] Filed: Jan. 16, 1996

Related U.S. Application Data

[63] Continuation-in-part of application No. 08/510,766, Aug. 3, 1995.

[51] Int. Cl.$^6$ ............................................ B32B 7/12
[52] U.S. Cl. .................. 428/343; 428/346; 428/355 R; 428/355 RA; 355/72; 355/74
[58] Field of Search ............................. 428/701, 355 R, 428/346, 172, 13, 35.7, 343, 355 RA; 355/72, 74, 75

[56] References Cited

U.S. PATENT DOCUMENTS

| | | | |
|---|---|---|---|
| 2,633,058 | 2/1953 | De Brouwer | 88/24 |
| 3,829,211 | 8/1974 | Mitchell | 355/74 |
| 3,944,364 | 3/1976 | Petrini et al. | 355/74 |
| 3,964,832 | 6/1976 | Cohen et al. | 401/75 |
| 4,155,644 | 5/1979 | Hess | 355/72 |
| 4,190,357 | 2/1980 | Kostiner | 355/74 |
| 4,247,198 | 1/1981 | Beyrenther | 355/74 X |
| 4,342,513 | 8/1982 | Gibbs | 355/74 |
| 4,601,573 | 7/1986 | Utsugi | 355/75 |
| 4,702,496 | 10/1987 | Hume, III | 281/15 R |
| 4,855,170 | 8/1989 | Darrell et al. | 428/40 |
| 5,190,818 | 3/1993 | Sakai | 428/355 |
| 5,278,227 | 1/1994 | Bernard | 524/817 |
| 5,384,187 | 1/1995 | Uemura et al. | 428/262 |
| 5,454,862 | 10/1995 | Jansen et al. | 106/213 |
| 5,491,006 | 2/1996 | Johnson et al. | 428/13 |

*Primary Examiner*—Bruce H. Hess
*Assistant Examiner*—Abraham Bahta
*Attorney, Agent, or Firm*—Juettner Pyle Piontek & Underwood

[57] ABSTRACT

A reusable display holder, easel, copyboard or work board utilizes a tacky pressure sensitive adhesive for temporarily holding display materials, photographic prints and like products securely in position; or for capturing and retaining residue and debris falling from work pieces; or for other similar applications. When used with photographic exposure apparatus, for example, the board comprises an easel which allows exposure of multiple sizes of photographic prints or enlargements without changing the easel in any way and without using devices to position or secure the prints. The board or easel includes one or more trays of various dimensions depending on the particular application. A tacky pressure sensitive adhesive composition is poured into each tray to hold various products. The composition has readhesion properties which enable products to be removed, without damage, and then readhered to the composition. The preferred composition is a mixture of food thickening gel, a pharmaceutical grade glycol, and sufficient hot water to form a fluent mixture of thick but flowable consistency which upon cooling will set into a solid tacky gel. The process for preparing the tacky pressure sensitive adhesive composition requires a preselected ratio between the mixture components. After pouring the mixture into the trays, the mixture is allowed to cool and set to a solid so that products will adhere to the exposed surface of composition.

15 Claims, 1 Drawing Sheet

DISPLAY HOLDER EASEL AND WORK BOARD EMPLOYING REUSABLE PRESSURE SENSITIVE ADHESIVE

CROSS-REFERENCE

This application is a continuation-in-part of copending application Ser. No. 08/510,766, filed Aug. 3, 1995.

FIELD OF THE INVENTION

The present invention relates to a display holder, easel and work board for temporarily holding display materials, photographic prints and the like in a fixed position; or for receiving and retaining debris or residue falling from a work piece such as a micro-chip or circuit board or other product being worked on, for example, in a clean room atmosphere; and for other similar applications. The invention is characterized by a work surface comprising pressure sensitive adhesive that is readily cleaned and reusable, so that the board or holder can be used over and over again without requiring replacement of the adhesive.

BACKGROUND

The invention was originally conceived and developed for use in the photographic arts. Subsequently, a myriad of other uses manifested themselves, as will become apparent as the description proceeds. Nevertheless, the initial development was directed to providing borderless easels for photographic work.

Easels have been used in the photographic art for many years. The purpose of the easels is to provide a surface for holding photographic prints or enlargements. "Borderless" refers to prints that do not have or do not require borders in the developed prints.

In the photographic art, many different steps are required to produce prints or enlargements. An early step is to expose photographic paper to allow an image to be placed on the paper. Another step is to locate the paper in the correct position to allow focusing of an enlarger, or an image producing device, on the desired location on the paper. Still another part of this process is to position all the different sized paper sheets to be used for the particular task on the easel. Also, the paper must be positioned accurately and securely to avoid distortion in the developed print. This entire process is typically performed in the dark to avoid overexposing a print or film, thereby destroying the latent image. In addition, many photographers personally incur all expenses because they work independently rather than for a company.

It is clear from the above description that many problems are associated with the process of developing prints. One problem is the cost of the time spent in all these steps. Another problem is the cost of expensive photographic easels that can position papers accurately and securely. Still another problem is completing the process in the dark, trying to handle equipment with many movable parts, making adjustments to the easel, as well as sorting out of the multiple sized paper for specific assignments.

In an attempt to overcome some of the problems mentioned above, the prior art has attempted to make improvements in a wide variety of easels. Many patents have been granted on easels. One of the best known is the De Brouwer U.S. Pat. No. 2,633,058. This patent teaches adjustable bars and other devices to hold down paper to prevent movement and to expose the paper all the way to its edges. Hess, in U.S. Pat. No. 4,155,644, attempts to make an improvement upon De Brouwer by using support pads for paper and a single bar to hold paper in a desired position. Yet these easels do not have provision for special blades to print borderless color or black and white prints. Some four bladed easels include a fixed scale to measure the width or length of the paper. Another such easel is Kostiner U.S. Pat. No. 4,190,357. This patent teaches the use of sliding scales for measuring paper size, plus masking blades which are removable. Petrini and Van Lue's U.S. Pat. No. 3,944,364 teaches a relatively simple easel using a paper support base with removable mask plates which tends to maximize the use of print paper. Still another attempt to improve on existing inventions is the use of vacuum easels, which eliminate the need for mechanical securing devices for the paper and are thus able to provide "borderless" prints. Nevertheless, a major disadvantage is the complexity and extremely high cost of a vacuum easel.

In summary, numerous problems exist with the prior art mentioned and others just as typical. Most, if not all, require adjustments, replacements of parts, masking, expensive fixtures, maintenance, time consuming steps to make adjustments, and easel space taken up by various securing devices and parts. Therefore flexibility in the choice of paper size is limited.

It is desirable to have a borderless easel which can be used with paper of different sizes, maximizes the easel space, minimizes the user's time, and is inexpensive to manufacture as well as maintain. Such an easel should be convenient, reliable, durable, easy to use, and, most importantly, hold paper in a desired location without damage or distortion to the paper.

Adhesives of various kinds and properties have been developed to secure one surface to another, such as paper products. Numerous inventions have been patented in attempts to optimize the adhesive properties of gels and sticks to permit affixing paper products together as in Cohen et al. U.S. Pat. No. 3,964,832. Bernard in U.S. Pat. No. 5,278,267 teaches an adhesive to affix corrugated board to other surfaces without peeling. Sakai in U.S. Pat. No. 5,190,820 teaches an adhesive which allows removal of paper products from another surface without tearing or leaving of an adhesive residue. Yet each of these patented inventions exhibit problems when considered in conjunction with a borderless easel. In many cases, the composition of the gel or adhesive is extremely complex in development, production, or in environmental requirements.

It is desirable to have an inexpensive, quick setting adhesive which allows a paper product to adhere to, yet be removable from an adhesive. Such an adhesive would be ideal for use with a borderless easel to allow paper prints to be held quickly and securely without the use of various devices, bars, masks, pins, weights or magnets.

Therefore, with all the noted problems, there is still a continuing need for a borderless easel using a pressure sensitive adhesive.

OBJECTS OF THE INVENTION

Initial objects of this invention are, therefore, to provide a borderless easel that overcomes the above noted problems, that secures paper quickly, that requires no adjustments, that is reusable, that minimizes the user's time to process photographic prints, and that is inexpensive to manufacture and maintain.

An additional object of the invention is provide display or presentation holders, bulletin boards and the like having a reusable adhesive surface to which papers, posters, charts, announcements, notices, etc. may be affixed without need for pins, tacks or other securing devices; from which previously affixed displays, papers, etc. may easily be removed without injury or damage to either the removed item or the board or the adhesive surface, and to which additional items may be affixed without requiring restoration or renewal of the adhesive surface.

Another object of the invention is to provide work boards having a reusable adhesive surface for use in connection with work benches and like environments where debris or residue removed and falling from work pieces is desired to be collected and retained so as not to contaminate the products being worked on and/or to permit salvage and reclamation of the removed material, e.g, in the case of precious metals; that will capture and retain the debris or residue; that will facilitate removal and/or reclamation of such debris or residue; that is readily cleaned for reuse; and that is repeatedly reusable without need for restoration or renewal of the adhesive surface.

SUMMARY OF THE INVENTION

The above objects, and others, are accomplished in accordance with this invention. Briefly stated, the invention provides reusable borderless easels, display holders and work boards which employ a tacky pressure sensitive adhesive for holding products, such as papers, in fixed position. In one specific embodiment, the present invention provides a photographic exposure apparatus that allows processing of multiple sizes of photographic prints or enlargements without changing the easel and without using devices to position or secure the prints.

The easel includes one or more trays, usually rectangular, each having a bottom portion and a sidewall. Each tray can have various dimensions depending on the particular application. A tacky pressure sensitive adhesive composition is poured into each of the trays which, upon setting up, provides a means for positioning and holding products in each of the trays. The composition has readhesion properties which enable photographic sheets, prints, posters, displays and other paper-like products to be removed and then readhered to the composition. In addition, the paper-like products are not damaged upon being removed from the composition, nor is the composition adhered to the product or removed from the tray upon removal of the products.

The preferred pressure sensitive adhesive composition is a mixture primarily of food thickening gel, a pharmaceutical grade glycol, and sufficient hot water to form a fluent mixture of thick but flowable consistency that will subsequently solidify or gel.

The process for preparing the preferred tacky pressure sensitive adhesive composition involves first obtaining easily available consumer products such as a food thickening gel, pharmaceutical grade glycol, and ordinary household tap water. The gel and glycol are mixed in preselected ratios. Hot water is added to the mixture to form a thick but flowable consistency. The fluent mixture is poured into the trays and allowed to cool and set until a solid gel is formed and paper and like products will adhere to the exposed surface of the solid gel composition. A lid for each tray may be provided to prevent contaminants from contacting the adhesive composition.

Advantages of this invention include providing a borderless easel or tacky work or mounting surface which is inexpensive to manufacture, safe to use, has no moving parts, is easy to fabricate, includes flexibility to handle various sizes of photographic prints, posters, and paper, and includes a reusable, nontoxic adhesive which eliminates the need for bars, masks, pins, tacks and other securing devices.

In addition, the invention has virtually innumerable applications in the art, photographic, advertising, book printing, magazine, and television industries. Additionally, this invention has applications in preparing formal and extensive presentations, where graphs, charts and displays must be frequently changed or rearranged in order of presentation.

The smooth-surfaced tacky adhesive composition employed in the trays of the invention also facilitates the collection, retention, disposal and/or reclamation of residual debris and/or residue removed from work pieces during a manufacturing process. For example, microprocessor chips are cleaned and finished by hand in a clean room environment. Currently, in order to prevent the residue removed from a particular chip from contaminating that and/or other chips, the work surface on which the work is done is covered with two sided adhesive tape which is adhered to the work surface and has an exposed adhesive surface to catch and retain the falling debris or residue. The tape soon becomes contaminated and has to be replaced frequently. In contrast, by employing the trays of the invention to capture and retain the debris, the surface of the tacky, pressure sensitive adhesive composition can periodically be cleaned simply by flushing the surface with water and reusing the tray. Also, the debris flushed from the tray can easily be disposed of or reclaimed, for example in the case of precious metals, without endangering contamination of the finished work pieces.

These and other features and advantages of the present invention will become apparent from the following detailed description, as considered in conjunction with the accompanying drawings.

BRIEF DESCRIPTION OF THE DRAWINGS

Details of the invention, and of the preferred embodiments thereof, will be further understood upon reference to the drawings, wherein.

DETAILED DESCRIPTION OF THE PREFERRED EMBODIMENTS

Figure 1:
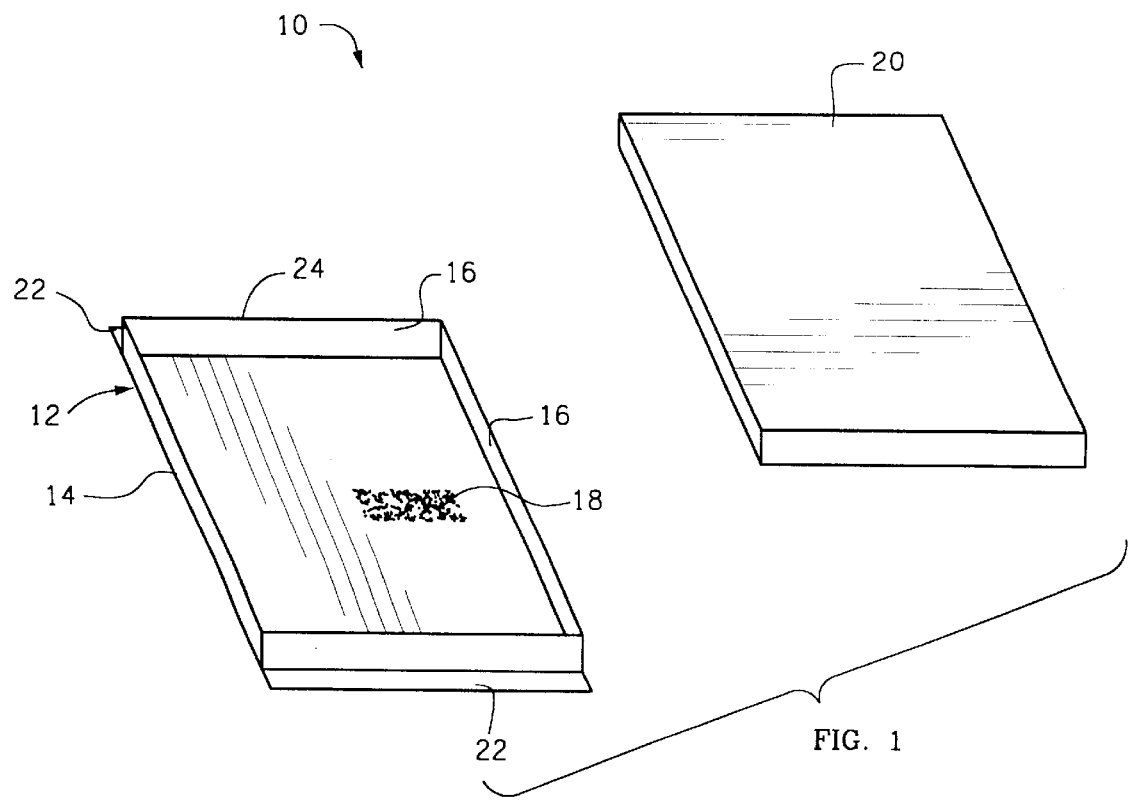
FIG. 1 is a perspective view showing a preferred embodiment of the invention and illustrating a tray with a bottom portion and sidewalls, a tacky pressure sensitive adhesive composition in the bottom portion and a lid.

Referring initially to FIG. 1, the perspective view shows a preferred embodiment of a borderless easel apparatus 10, illustrating a tray 12, with a generally planar bottom portion 14, sidewalls 16, a tacky adhesive composition 18 in the bottom portion 14, and a lid 20. More specifically, the illustrated embodiment provides a photographic exposure apparatus that allows exposure of multiple sizes of photographic prints or enlargements without changing the easel 10 in any way and without using devices to position or secure the prints.

One or more trays may be provided in each easel 10. Each tray 12 is, preferably, generally rectangular with four sidewalls 16. Each tray 12 is typically manufactured to various dimensions depending on the particular application. For photographic work, the width and length dimensions of typical trays would be 8×10 inches, 11×14 inches and 16×20 inches. Other shapes and sizes can of course be provided depending on the intended use. Each tray 12 is preferably fabricated from plastic, although other materials may be used. Plastic provides an inexpensive, lightweight and portable product with easily cleaned surfaces.

Another feature of the tray 12 are flanges 22 attached to the bottom portion 14. More specifically, flanges 22 are attached to opposite sides of the bottom portion 14. As shown in FIG. 1, flanges 22 are located at the ends of the tray 12. The purpose of the flanges 22 is to provide relatively thin flat surfaces for taping to another surface, such as a table. With the tray 12 taped to a table, the user does not have to worry that the tray 12 will accidentally be moved upon contact with one's hand or arm. Therefore, little risk exists for improperly positioning a paper on the tacky composition 18 in a darkened room. Preferably, the flanges 22 are fabricated from plastic, and may be integrally formed with the tray 12. Although the flanges 22 may have different dimensions, preferably, each is about ¼ inch in width, while its length is essentially equal to the width of the tray 12.

Each sidewall 16 is formed at a vertical angle of about 90 degrees from the bottom portion 14. The sidewalls 16 project upwardly from the bottom portion 14 for at least approximately one half inch. Also, each sidewall 16 has a top edge 24. The purpose of the sidewalls 16 is to hold the tacky adhesive composition 18 within the tray 12.

The adhesive composition 18 is also pressure sensitive, meaning that when a paper-like product is pressed against it, the product will adhere in position without further movement. The tacky consistency of the composition 18 also ensures that paper products will stick to it. One of the advantages to the present invention is that only hand pressure is necessary to affix a photographic print or other paper product to the composition 18. The composition 18 has readhesion properties which enable photographic sheets, prints, posters and other paper-like products to be removed and then readhered to the composition 18. In addition, paper-like products are undamaged by being removed from the composition 18. The reusable, nontoxic adhesive composition 18 eliminates the need for bars, masks, pins, tacks and other securing devices which have been required in the prior art.

The process for preparing a preferred tacky pressure sensitive adhesive composition 18 involves first obtaining easily available consumer products such as a food thickening gel, a pharmaceutical grade glycol, and ordinary household tap water. An example of such a gel is "Rich-N-All". Glycol is typically called glycerine. The gel and glycol are mixed in a preselected ratios. A sufficient quantity of hot water is added to the mixture to form a thick but flowable consistency. The fluent mixture is poured into the trays 12, until the mixture is dispersed evenly throughout each tray 12 and forms a substantially flat or planar top surface. The mixture is then allowed to cool and set until a solid gel is formed. Setting may normally take approximately four hours. Cooling the mixture is typically accomplished at an ambient room temperature between about 50 degrees F. to 80 degrees F. However, preferably, the setting temperature is 70 degrees F. or less. The mixture is poured until it almost reaches the top edge 24 of the sidewalls 16. Then the composition 18 provides a smooth, flat, tacky surface for positioning and holding paper-like products in each of the trays 12.

For photographic, presentation and poster board applications, the mixture may comprise (a) at least one part by weight of food thickening gel; (b) at least 5 parts by weight of pharmaceutical grade glycol; and (c) a sufficient quantity of hot water to form a thick but flowable consistency, the total amount of the components (a) and (b) being in the range of from 6 to 16 parts by weight. The mixture ranges from 1 to 5 parts of food thickening gel and from 5 to 11 parts of glycol. One suitable mixture comprises 1¼ parts of the food thickening gel and 6.5 parts of the glycol. Another comprises 1 part of the food thickening gel and 5 parts of the glycol. A particularly useful mixture comprises 1 ounce of gel, 5 ounces of glycerine, and four ounces of water. The food thickening gel can be any of several thickening gels, such as corn starch or wheat starch.

The glycol which is used in this invention is preferably in the propylene class of the glycol family. Glycol is any of a class or organic compounds belonging to the alcohol family. They are colorless, viscous liquids or low-melting solids which are readily convertible into other compounds, such as esters, or ketones. Glycol also has a low viscosity in aqueous solution. Several useful characteristics make this compound key to the success of this invention. It is non-toxic, used in food stuffs, can function as a resin, absorbs moisture and is inexpensive. Therefore, this product is safe to use.

For photographic, presentation and display applications, another and preferred composition, which is somewhat more tacky and even less expensive, is comprised of 3 ounces (parts) gel, 4–5 ounces (parts) glycol, 9 ounces (parts) water and ⅛ teaspoon (0.02 ounces or parts) oxalic acid or equivalent.

A lid 20 for each tray 12 is provided to prevent contaminants, such as dust, from contacting the adhesive composition 18. In addition, it is easier to store the easel 10 using the lid 20. A user does not contact the adhesive composition 18 with hands or clothing when the lid 20 is used. Preferably, the lid 20 is planar and dimensioned so as to easily fit over each of the bottom portions 14. Each lid 20 is also removable from the bottom portion 14. The lid 20 is also, preferably, fabricated from plastic, although other materials may be used.

Figure 2:
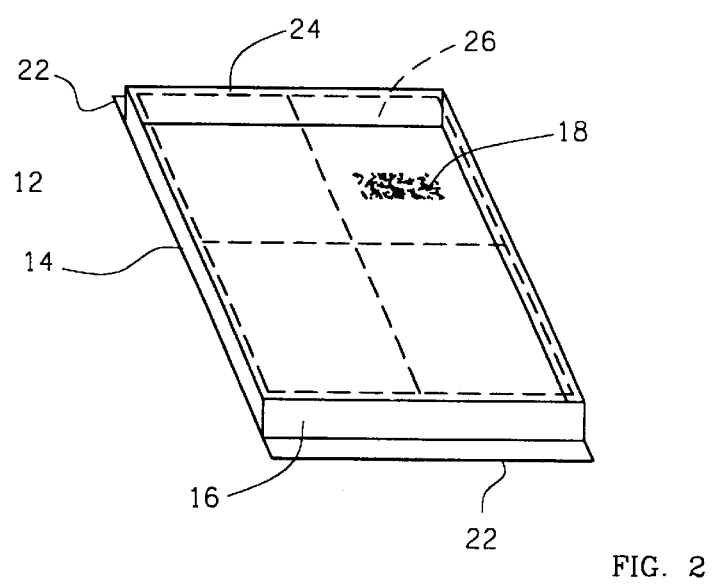
FIG. 2 is a perspective view of the bottom portion of the embodiment of FIG. 1 illustrating, by way of example, four prints adhering to the tacky pressure sensitive adhesive composition, thereby maximizing the use of the tray dimensions.

Referring next to FIG. 2, a top view of the bottom portion 14 of the tray 12 illustrates, for purposes of example, four prints 26 adhering to the tacky pressure sensitive adhesive composition 18, thereby maximizing the use of the easel dimensions.

Other advantages of this invention include being inexpensive to manufacture, particularly since it has no moving parts. The easel 10 is versatile because it can hold various sizes of photographic prints, posters, photographic paper and photocopy paper. The present invention has virtually innumerable applications in the art, photographic, advertising, book printing, magazine, television, video and movie industries. Additionally, this invention has applications as a copy board in preparing formal and extensive presentations, where charts and displays must be frequently changed or rearranged on a surface in order of presentation.

Another field for application of the invention resides in clean room and other work atmospheres where debris, residue or materials removed from a work piece must be captured and retained so as not to contaminate the piece being worked on and other work pieces and/or to permit salvage and reclamation of removed materials, e.g., precious metals. For such applications, the tray 12 may be made of such size and shape as necessary to conform to and be compatible with the work station for reception and retention on the tacky surface 18 of the removed or residual material.

Because the composition is comprised of food gel, the surface may periodically be flushed with water to remove accumulated debris or removed or residue materials, thereby to clean the surface and restore its tacky consistency for reuse. Thus, a given tray may be used over and over again to provide an economical and practical receptor for debris or other material removed from work pieces. Also, flushing the surface with water facilitates salvage and reclamation of the removed materials wherever that may be desired.

For these latter applications, a composition providing an especially tacky and readily renewable receptor surface will usually be desired. A presently preferred composition is comprised of 1 ounce or part gel, 6.5 ounces or parts glycol alcohol, 0.5 ounce or part water, ¼ teaspoon (0.042 ounce or part) oxalic acid or equivalent, and 1.5 ounce or part isopropyl alcohol. When set, this composition provides an exceptionally tacky gel surface which is readily flushed, cleaned and restored with ordinary tap water.

The objects, features and advantages of the invention have thus been shown to be achieved in a convenient, economical, facile and practical manner.

For convenience in manufacture and marketing of the product, and to insure a long shelf-life for the adhesive, the product may be marketed in kit form comprising the tray 12, a container for the constituents of the adhesive, and a set of instructions on how to prepare the adhesive for pouring into the tray and to cause it to set and solidify to the desired tacky surface. Adhesive replacement kits may similarly be provided.

Consequently, while the foregoing description has described the principle and operation of the present invention in accordance with the provisions of the patent statutes, it should be understood that the invention may be practiced otherwise than as illustrated and described above and that various changes in the size, shape and materials, as well as in the details of the illustrated construction may be made, within the scope of the appended claims, without departing from the spirit and scope of the invention.

What is claimed is:

1. A reusable photographic easel, display holder or work board for temporarily holding work products in a fixed and flat position comprising a tray having a bottom portion and side walls, and a solid gel of tacky pressure sensitive adhesive composition formed from a food thickening gel, a pharmaceutical grade glycol and hot water in said tray, said composition having an exposed, generally planar, reusable, tacky adhesive surface for repeatedly receiving and for temporarily and removably positioning and retaining different work products in a fixed and flat position on said generally planar surface and for accommodating removal of the work products from said surface without damage to the products or said surface.

2. A reusable photographic easel, display holder or work board as set forth in claim 1, wherein said surface of said composition is water flushable to clean said surface for repeated use.

3. A reusable photographic easel, display holder or work board as set forth in claim 1, wherein said composition is comprised of about one to five parts gel, about five to eleven parts glycol and water.

4. A reusable photographic easel, display holder or work board as set forth in claim 1, wherein said composition is comprised of about one part gel, about five parts glycol and about four parts hot water.

5. A reusable photographic easel, dispay holder or work board as set forth in claim 1, wherein said composition is comprised of about three parts gel, about four to five parts glycol, about nine parts hot water, and a fraction of a part of oxalic acid.

6. A reusable photographic easel, display holder or work board as set forth in claim 1, wherein said composition is comprised of about one part gel, about six and one-half parts glycol, about one and one-half parts isopropyl alcohol, about one-half part hot water, and a fraction of a part of oxalic acid.

7. A process for making and using a reusable photographic easel, display holder or work board for temporarily holding work products in a fixed and flat position comprising the steps of providing a tray having a bottom portion and side walls, mixing together a food thickening gel, a pharmaceutical grade glycol and sufficient hot water to form a pourable fluent composition that is capable of setting into a solid gel, and that, when set into a solid gel, will have a reusable, tacky, pressure sensitive adhesive surface, pouring the fluent composition into the tray to form within the bottom portion of the tray a layer of composition having an exposed and generally planar surface, and cooling and setting the composition to a solid gel having an exposed, generally planar, reusable, tacky pressure sensitive adhesive surface and repeatedly using said surface for receiving and temporarily and removably positioning and retaining different work products in a fixed and flat position on said surface and for accommodating removal of work products from said surface without damage to the products or said surface.

8. A process as set forth in claim 7, including the step of mixing together a fluent composition comprised of about one to five parts, gel, about five to eleven parts glycol and sufficient hot water to form an initially pourable and subsequently settable gel.

9. A process as set forth in claim 8, including the step of mixing together a fluent composition comprised of about one part gel, about five parts glycol and about four parts water.

10. A process as set forth in claim 8, including the step of mixing together a fluent composition comprised of about three parts gel, about four to five parts glycol, about nine parts water, and a fraction of a part of oxalic acid.

11. A process as set forth in claim 8, including the step of mixing together a fluent composition comprised of about one part gel, about six and one-half parts glycol alcohol, about one and one-half parts isopropyl alcohol, about one-half part water, and a fraction of a part of oxalic acid.

12. A process as set forth in claim 9, including the step of using the tray as a borderless photographic easel.

13. A process as set forth in claim 10, including the step of using the tray as a borderless photographic easel, a presentation easel and/or a display board.

14. A process as set forth in claim 11, including the step of using the tray as a work surface for capturing and retaining residue and debris removed or falling from work pieces positioned above said surface.

15. An easel, holder or board as set forth in claim 1, wherein said tray is further comprised of two flanges integrally attached to said bottom portion at opposite sides of said tray, whereby said flanges may be taped to a surface to prevent inadvertent movement of said tray.

* * * * *